(12) United States Patent
Joshi et al.

(10) Patent No.: US 6,668,707 B2
(45) Date of Patent: Dec. 30, 2003

(54) FUEL-EFFICIENT STEAM COOKING DEVICE

(76) Inventors: Jyeshtharaj Bhalchandra Joshi, Nandadeep (IN); Shirish Bhailal Patel, Nandadeep (IN)

(*) Notice: Subject to any disclaimer, the term of this patent is extended or adjusted under 35 U.S.C. 154(b) by 0 days.

(21) Appl. No.: 10/149,475

(22) PCT Filed: Dec. 6, 2000

(86) PCT No.: PCT/IN00/00120
§ 371 (c)(1),
(2), (4) Date: Nov. 18, 2002

(87) PCT Pub. No.: WO01/39640
PCT Pub. Date: Jun. 7, 2001

(65) Prior Publication Data
US 2003/0136270 A1 Jul. 24, 2003

(30) Foreign Application Priority Data
Dec. 6, 1999 (IN) .......................... 892/BOM/99

(51) Int. Cl.⁷ .......................... A23L 1/00; A47J 27/00; A47J 27/05
(52) U.S. Cl. .......................... 99/417; 99/330; 99/403; 126/369; 126/381.1; 219/401
(58) Field of Search .......................... 99/330, 339, 340, 99/403–418, 444–450, 516, 517; 126/20, 214 R, 369, 211, 369.1, 369.2, 373.1, 377.1, 381.1; 220/912, 428; 219/401, 521, 415, 454, 418, 386, 430; 426/510, 511, 523

(56) References Cited

U.S. PATENT DOCUMENTS

| | | | | |
|---|---|---|---|---|
| 776,926 A | * | 12/1904 | Misener | 126/369 |
| 2,097,478 A | * | 11/1937 | Struble | 99/412 |
| 3,808,963 A | * | 5/1974 | Ludena | 99/417 |
| 4,509,412 A | * | 4/1985 | Whittenburg et al. | 99/331 |
| 5,515,773 A | * | 5/1996 | Bullard | 99/330 |
| 5,794,524 A | * | 8/1998 | Kemker et al. | 99/348 |
| 6,055,901 A | * | 5/2000 | Gantos et al. | 99/412 |
| 6,078,029 A | * | 6/2000 | Trujillo et al. | 219/415 |

FOREIGN PATENT DOCUMENTS

| | | | |
|---|---|---|---|
| DE | 344 639 | * | 11/1921 |
| DE | 171 662 | * | 9/1934 |

* cited by examiner

*Primary Examiner*—Timothy F. Simone
(74) *Attorney, Agent, or Firm*—John P. White; Cooper & Dunham LLP

(57) ABSTRACT

The invention provides a novel cooking device that saves more than 70% fuel as compared to conventional cooking systems and comprises, (i) a basal receptacle, (ii) a series of cooking utensils, and (iii) inner cover and outer cover, both engaged firmly to the basal receptacle.

27 Claims, 15 Drawing Sheets

*Prior Art*

*Prior Art*

*Prior Art*

*Prior Art*

*Prior Art*

*Prior Art*

*Prior Art*

A

FUEL-EFFICIENT STEAM COOKING DEVICE

This application is a §371 national stage of PCT International Application No. PCT/IN00/00120, filed Jun. 12, 2000, designating the United States of America, which claims priority of Indian Application No. 892/BOM/99, filed Jun. 12, 1999, the contents of which are hereby incorporated by reference.

1. Technical Field

The present invention relates to a fuel-efficient steam cooking device that saves more than 70% of the fuel consumed by conventional steam cooking systems. In addition, the device is safe and easy to operate and manufacture. The cooking device of the invention operates primarily on steam and requires slow cooking, whereby good flavor is imparted to the food cooked in the system.

2. Background Art

The traditional method of cooking is by boiling the food or simmering in a vessel with an open top. In some cases, the top is covered by a lid. Food is placed inside the vessel with adequate quantity of water and the bottom of the vessel is placed directly on the flame. This is shown in FIG. 1.

Cooking in the device of FIG. 1 takes place as the temperature in the cooking vessel rises to 100° C., and is maintained at that temperature until cooking is complete. The food may or may not be stirred while the cooking is in progress. If the flame is quite strong and there is insufficient water in the vessel, there is a possibility of the food which is in contact with the bottom of being charred.

U.S. Pat. No. 2,097,478 discloses a cooking utensil comprising an outer vessel that supports an inner vessel in lowered and raised positions. The outer vessel includes a cylindrical flange that is permanently fitted within a circumferential trough in the wall of the outer vessel. The outer vessel is adapted to support the inner vessel thereby requiring the vessels to be purchased as a combination. Also, the support flanges in the cooking utensil may prove a hindrance when trying to clean the utensil.

Similarly, the prior art has yet another cooking utensil called Rukmini cooker as shown in FIG. 2, comprising a stack of cylindrical cooking vessels that fit one on top of the other, with a lid over the upper-most cooking vessel. Each cooking vessel may contain a different food item. The entire assembly is held together by a lifting frame or cradle, so that it can be lifted as a single unit. This assembly is then lowered into a deep container of slightly larger diameter, which has water at the bottom. This deep outer container has a tight-fitting lid. It is placed on a stove usually of the same diameter as the outer container. The water in the deep outer container gets converted into steam when heated and this steam helps in cooking the food within the cooking vessels. This steam condenses, returns to the base as water, and is once again converted to steam. The temperature of the food in the cooking vessels is gradually raised to 100° C., and maintained at that temperature as long as steaming continues. The advantage of this cooker is that several food items are cooked simultaneously, and that the food requires no stirring since it cannot be charred by overheating. The disadvantage is that the heat energy dissipates from inside to outside and hence, significant fuel is burnt to cook the food using this cooker. In addition, as the outer container is hot, it is not safe.

A somewhat similar steam cooker, without the outer vessel of the Rukmini cooker, is shown in FIG. 3. This cooker consists of a stack of cylindrical cooking vessels placed directly on the flame. The lowest vessel contains water only. The steam produced is passed into the upper vessels in various ways. Some vessels have a perforated bottom. Other vessels are fitted with a central pipe which serves to carry steam, into the vessels above the basal vessel.

Another instance of a cooking vessel in the prior art is the Haybox or Insulation Cooker, which is shown in FIG. 4. It consists of a thermally insulating chamber with a thermally insulating lid. Food is brought to boiling point in a vessel, but is not yet fully cooked. It is covered with a lid, and is then placed in the Haybox. The insulating lid of the Haybox is put into place, and the whole assembly is left undisturbed for a while. The food inside the cooking vessel continues to cook in its own heat. Fuel economy results because part of the cooking takes place in the insulating chamber, with no explicit supply of heat.

Industrial kitchens and canteens, where cooking is carried out in bulk, often use steam cookers, shown in FIG. 5. Such cookers consist of double-walled double-bottomed stainless steel vessels, where food is placed in the inner vessel. Steam is generated from a separate source such as a separate boiler, and is circulated in the gap between the double walls and double bottoms of the cooking vessels. Condensed steam collects in the outer bottom, from where it is piped back to the boiler. The food in the inner vessels has its temperature raised to 100° C., and it is maintained there until cooking is complete.

Pressure Cookers, as shown in FIG. 6, work on the principle of raising the boiling point to a higher temperature, usually about 120° C. at about 2-atmosphere pressure. The food is placed in one or more containers, which are then placed inside an outer container with water at the base. The outer container is then closed with an air-tight lid equipped with a safety valve, which does not allow the pressure within to build up over about 2 atmospheres. As the outer container is heated, the temperature within rises to 120° C. A further rise in temperature is prevented by the safety valve allowing steam to escape so that the pressure within is restricted to about 2 atmospheres. Because of the elevated temperatures, the food cooks more quickly, and there is some saving in fuel consumption. There is little or no danger of charring of the food so long as the water remains in the outer container. Pressure cookers are popular because they reduce the time taken to cook food. The disadvantage is that manufacturing the pressurized container, its lid and seal is a complex process; and that there is always a danger of explosion should the safety valve get stuck. Further, the steam escapes from the cooker expelling the flavour and fragrance of the food cooking in the cooker and hence, some aroma and taste of the food is also lost. Furthermore, there is always a possibility of the food being overcooked.

U.S. Pat. No. 6,078,029 provides an efficient cooking range system, which maximizes the contact between the heating element of a cooking range and the cooking pot. The cooking device of this patent is shown in FIG. 7. An insulating air is provided on the interior base and the interior perimeter side wall of the cooking well which is present in the cooking pot. This system has several disadvantages including the fact that all the elements need to be purchased as a combination. This cooking system occupies a lot of space and is un-economic. In most of these systems, fuel economy is not a significant consideration. Moreover, steam is not used as a medium to transmit heat energy in other parts of the vessel.

While the cooking devices of prior art fulfil the respective objects and requirements, the prior art lacks a cooking device which is simple, easy to manufacture, allows slow and proper cooking and economizes on the fuel consumed.

Accordingly, there is a need for a cooking device which economizes on fuel, is safe and easy to handle and imparts flavour and taste to food.

OBJECTS OF THE INVENTION

The main object of the invention is to provide an efficient cooking device that saves more than 70% of the fuel consumed by conventional cooking systems.

Another object is to provide a cooking device wherein cooking is effected by circulation of steam.

Yet another object of the invention is to provide a cooking device which is safe and has none of the hazards of explosion associated with pressure cookers.

Another object is to provide a cooking device wherein the cooking of the food items is effected slowly so that the flavour and taste of the food is retained.

Still another object of the invention is to provide a cooking device wherein several food items can be cooked simultaneously, instead of sequentially.

Another object is to provide a cooking device in which there is no danger of the food burning, or of the food attaining elevated temperatures which would affect the flavour and quality of the cooked food.

Still another object is to provide a cooking device wherein any conventional source of fuel, such as gas, kerosene, coal, wood or cow-dung and electricity can be used for cooking food.

One more object is to provide an efficient cooking device that uses simple technology and can be manufactured at low cost in regard to materials and labour and can be sold at affordable rates.

SUMMARY OF THE INVENTION

The invention provides a novel cooking device that saves more than 70% fuel as compared to conventional cooking systems and comprises:

(i) a basal receptacle, (ii) a series of cooking utensils, and (iii) inner cover and outer cover, both engaged firmly to the basal receptacle.

DETAILED DESCRIPTION OF THE INVENTION

As mentioned in the foregoing section, several cooking utensils are known in the prior art. One typical utensil is depicted in FIG. 1, wherein the utensil consists of a simple vessel (1) provided with a lid (2). A modification of this cooking utensil i.e. Rukmini cooker is shown in FIG. 2 which cooker has an outer vessel (3) into which are placed a series of cooking vessels (4). This cooker is provided with a lid (5). It may optionally be provided with a stand (6) and the cooking vessels may be provided with a cradle or lifting frame (7). Another steam cooker is shown in FIG. 3 wherein a stack of cooking vessels (8) is provided with lid (9) and pipes (10) to carry steam to each cooking vessel. Some of the vessels of this cooker have a perforated bottom.

The Haybox cooker shown in FIG. 4 is yet another cooking system, having a thermally insulating chamber (11) with a thermally insulating lid (12). A vessel (10A) is kept in this chamber. For cooking, the food in the vessel is brought to boiling point and when the food is still uncooked, the vessel is placed in the Haybox. The Haybox is covered with a lid and the entire assembly is left undisturbed for completion of cooking. In Industrial Canteens where cooking is carried out in bulk, a steam cooker, as shown in FIG. 5, is used. This cooker consists of a double bottomed stainless steel vessels (14) and lid (15). The steam is generated from a separate source such as boilers and this steam is supplied to the gap between the walls and bottom of the cooking vessels through an inlet (13A). Steam circulates in the gap. The condensed steam is collected through a bottom outlet (13) and is piped back to the boilers. The temperature of the food is elevated and maintained as such until cooking is complete. Another cooking device working on steam is the pressure cooker as shown in FIG. 6, wherein food placed in one or more containers (16) and placed in an outer container (17) and closed with lid (18) having safety valve (18A). If the outer container is heated, the temperature within the system rises and pressure builds up on account of which, food in the system is cooked. Yet another cooking system can be seen in FIG. 7, which system consists of cooking utensils provided with an insulator on the interior base and the interior perimeter side walls of the cooking utensils. As each of the above cooking systems are constructed with certain specific objectives, there is no system in the prior art which is constructed with the focus of saving fuel and cooking food with the help of steam. In addition, none of the prior art cookers employ a thin layer of stagnant air located between the inner and outer covers to provide proper heat insulation.

Accordingly, the invention provides a novel and fuel-efficient cooking device as shown in FIGS. 8 to 15 of the accompanying drawings. The focus of the invention is to provide a cooking device wherein the process of cooking is effected slowly and the fuel consumed for cooking is saved to the extent of more than 70%.

The cooking device of the invention is illustrated by the accompanying drawings wherein.

Figure 1:
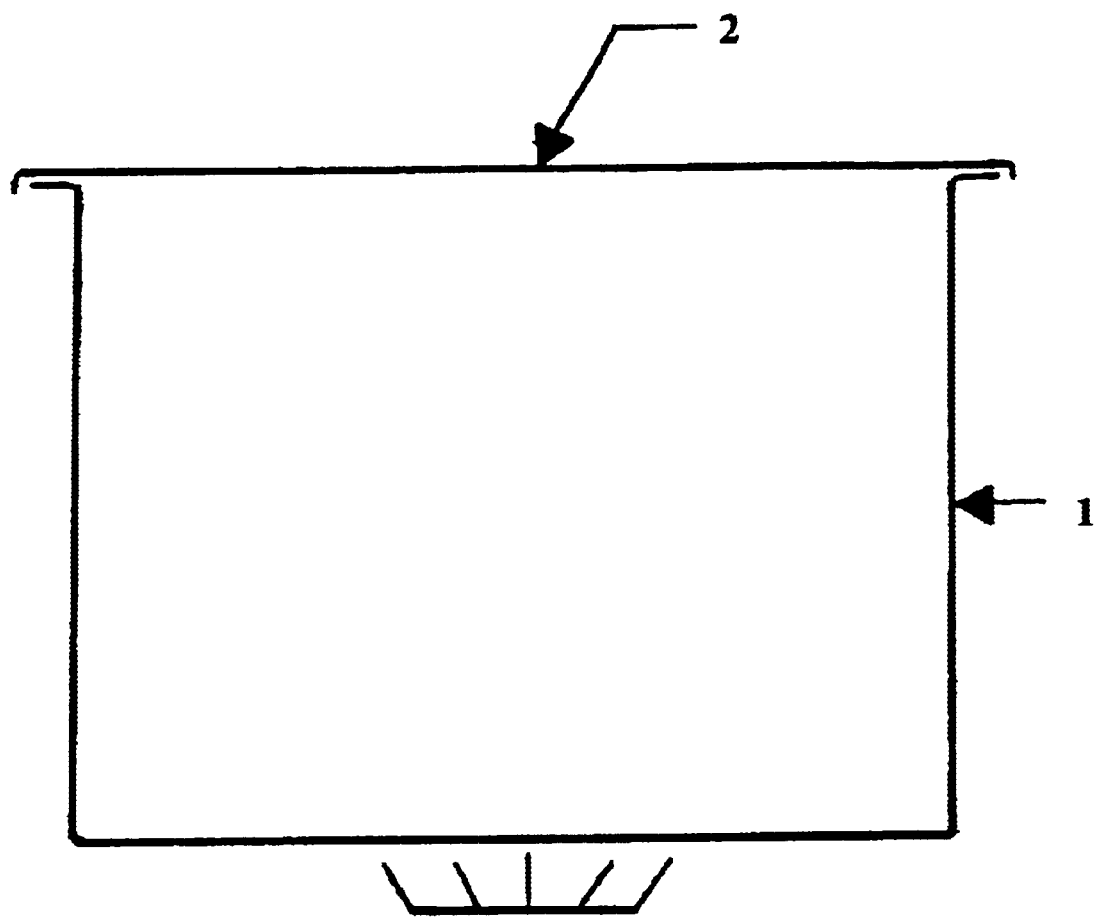
FIG. 1 represents a diagrammatic view of normal cooking in a cylindrical pot with or without a lid.
Figure 2:
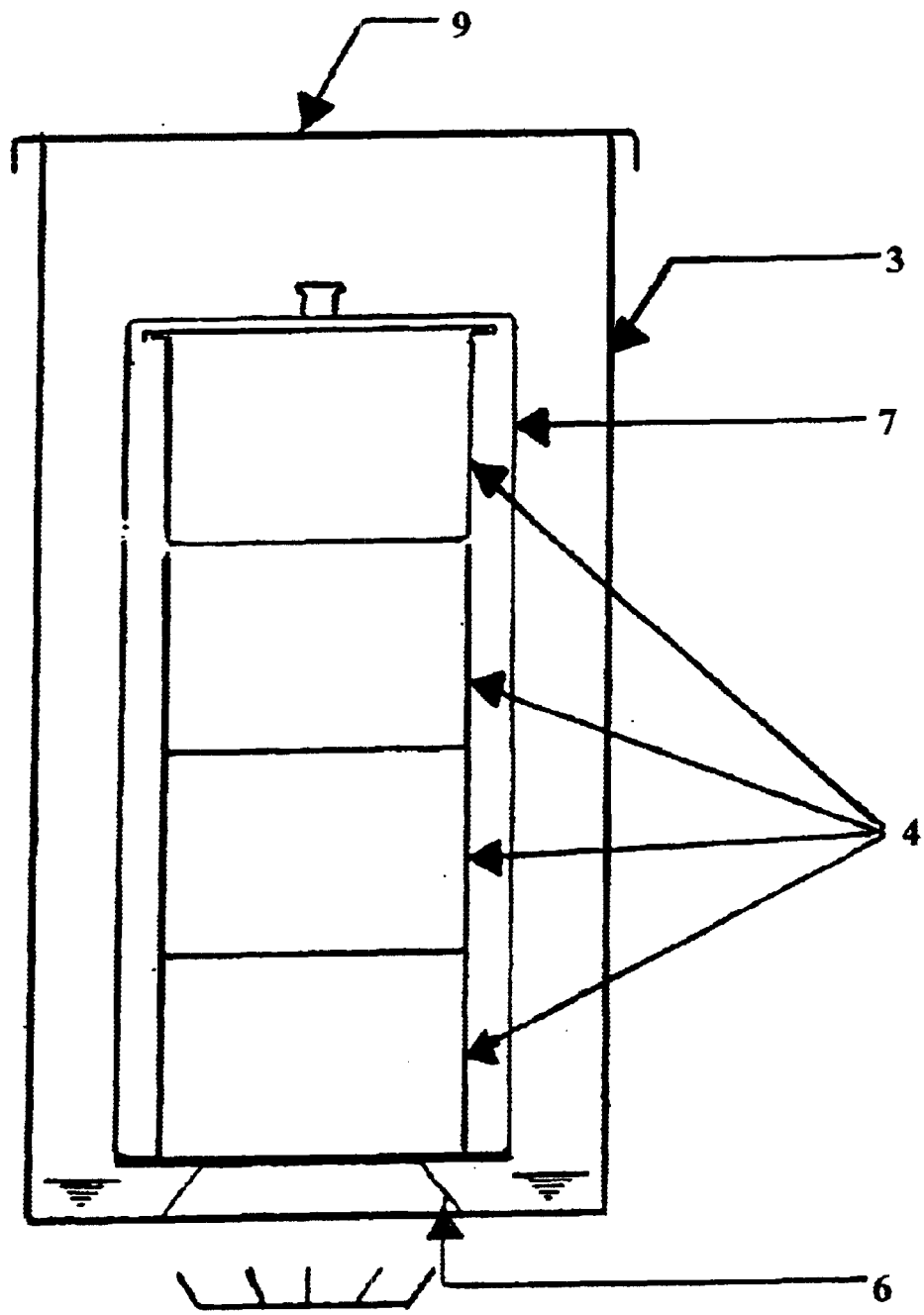
FIG. 2 represents the Rukmini cooker.
Figure 3:
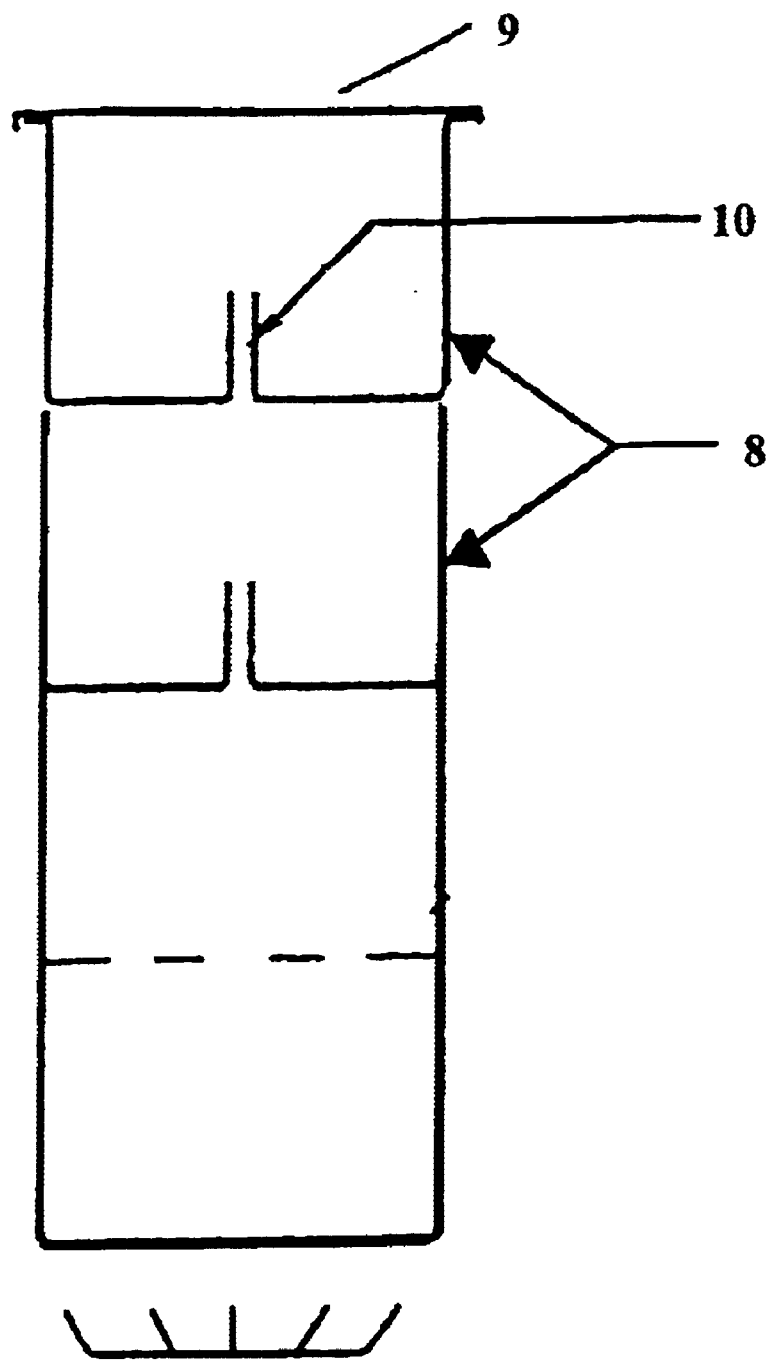
FIG. 3 represents a steam cooker with stacked cooking vessels where steam passes directly into all the chambers through various means, including internal pipes and perforated bottoms.
Figure 4:
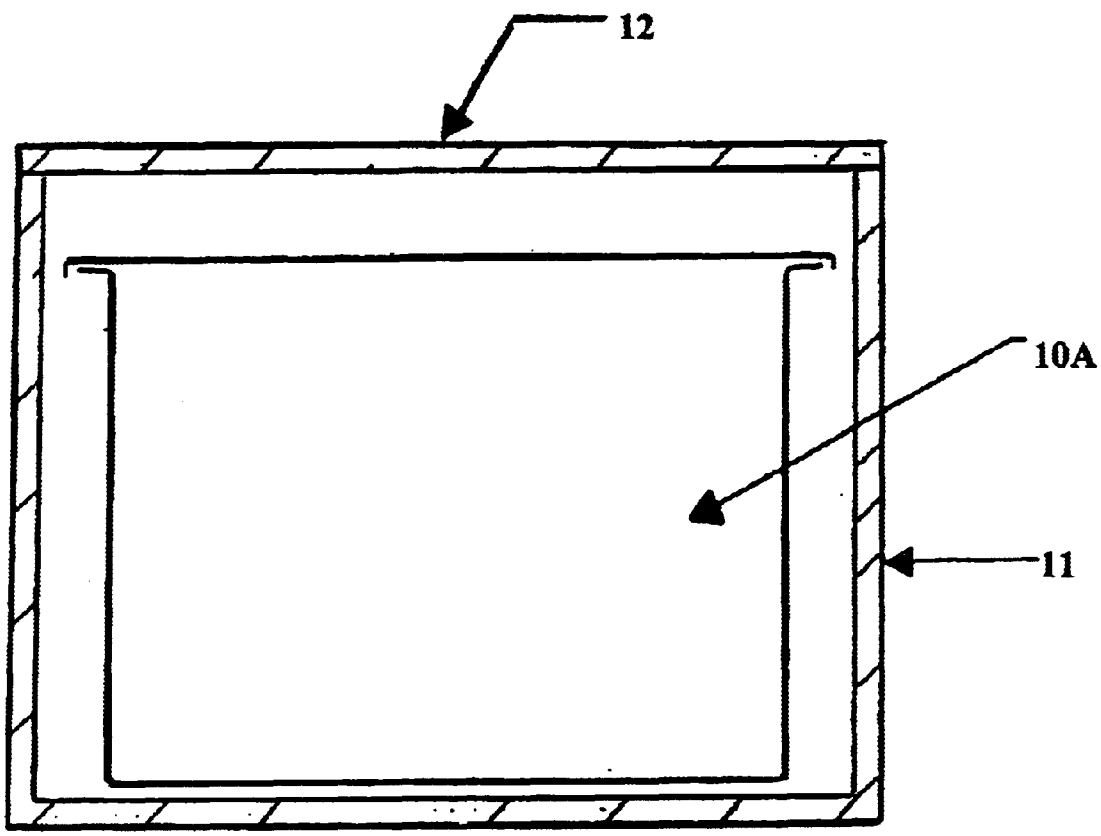
FIG. 4 represents a diagrammatic view of the Haybox cooker.
Figure 5:
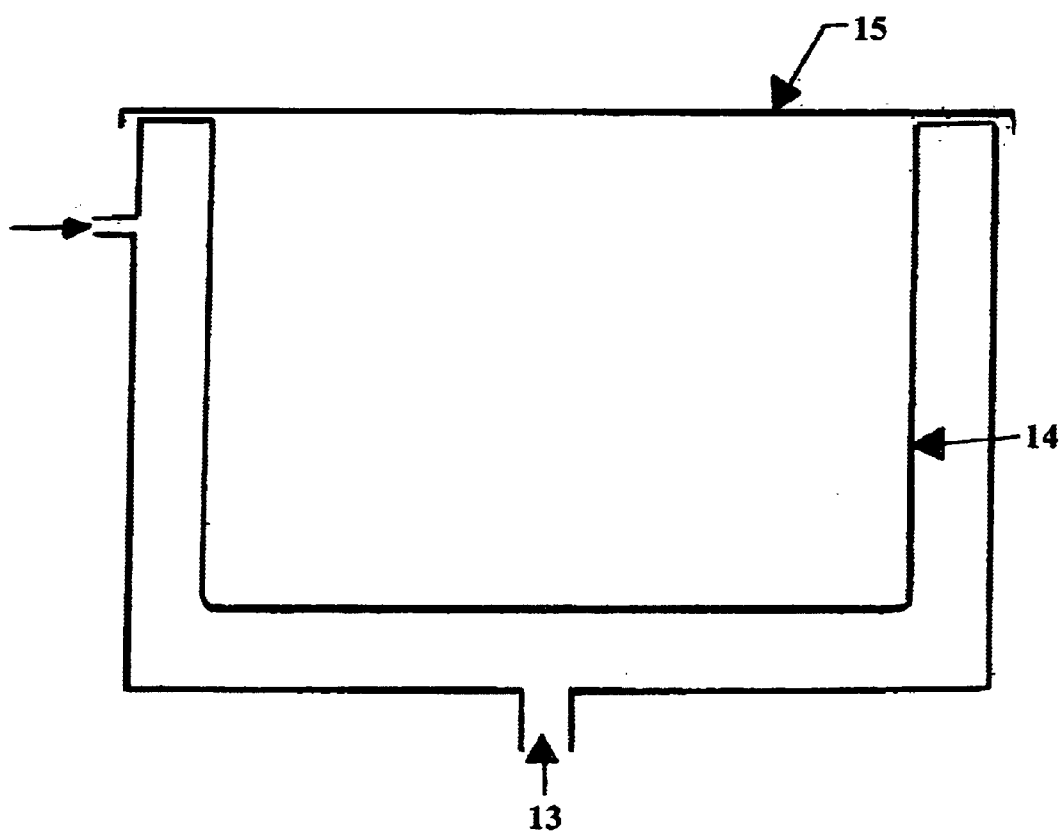
FIG. 5 represents a diagrammatic view of the Industrial cooker
Figure 6:
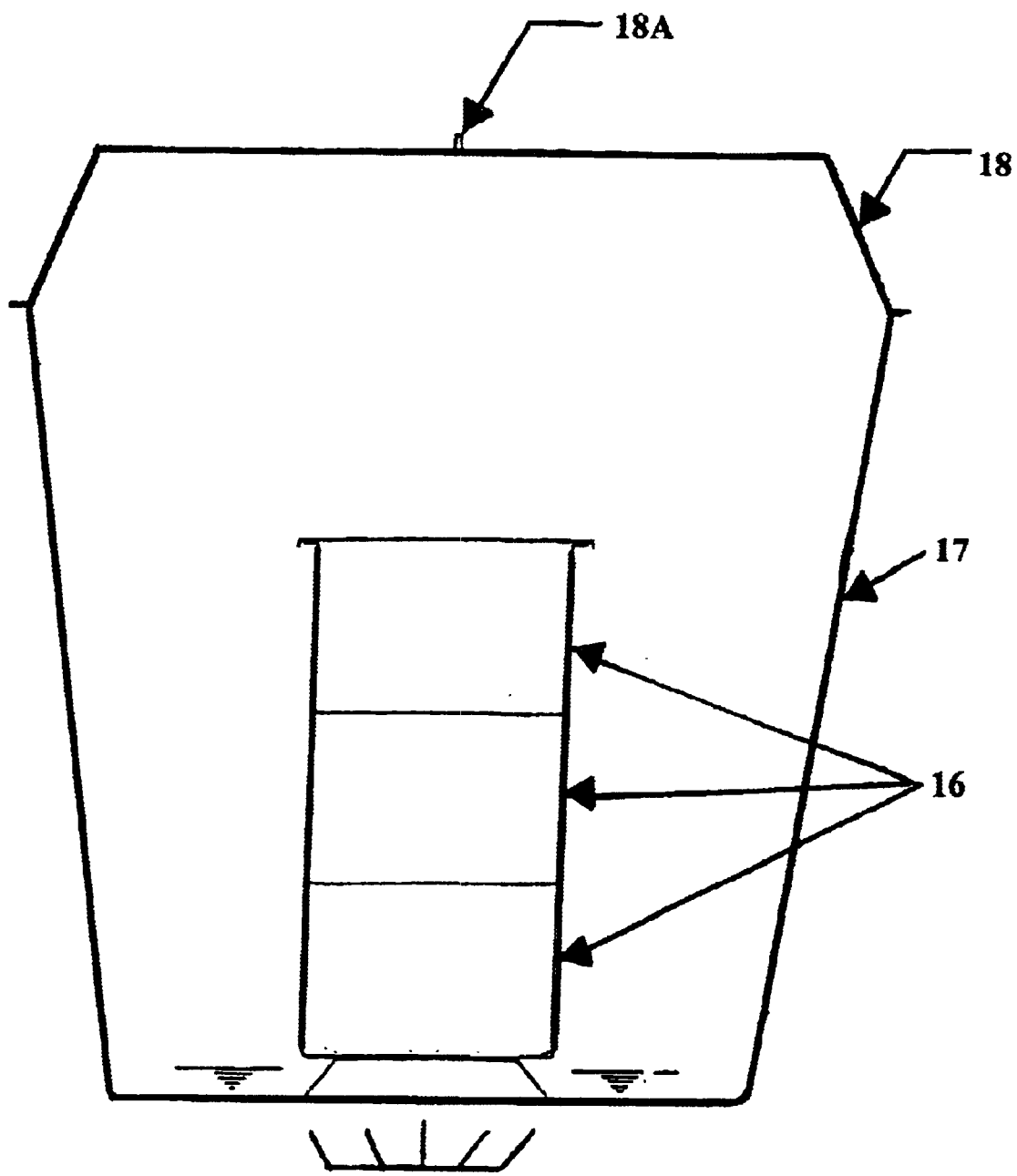
FIG. 6 represents a diagrammatic view of the Pressure cooker
Figure 7:
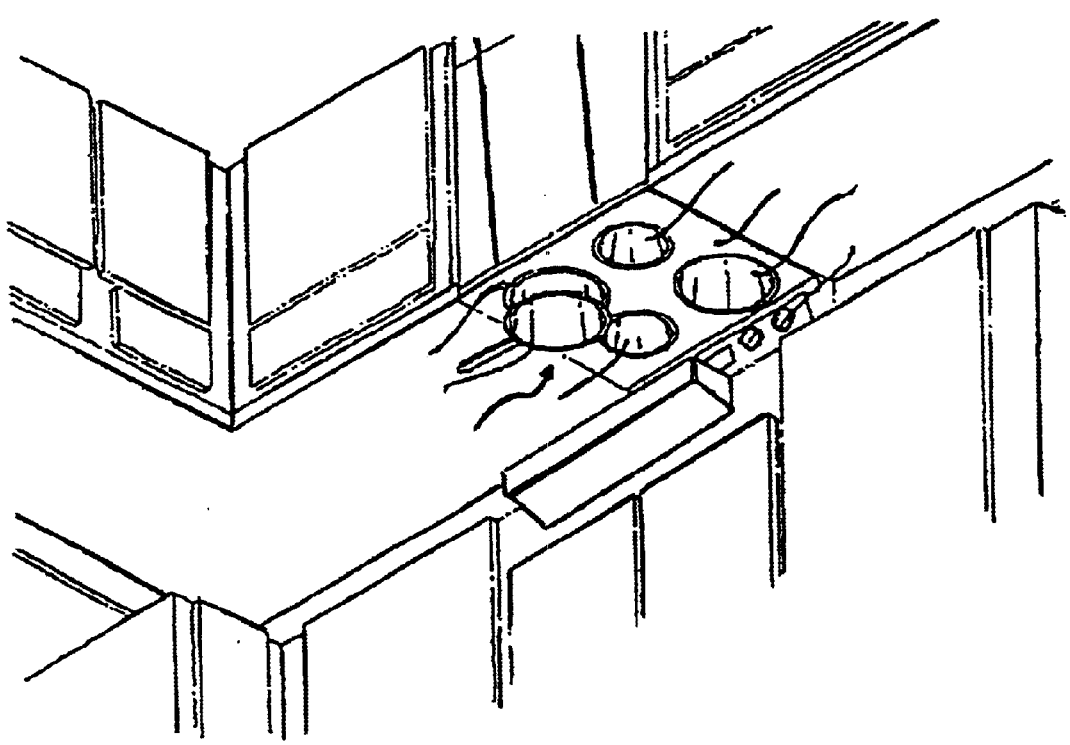

FIG. 7 represents a diagrammatic view of the cooker in U.S. Pat. No. 6,078,029

Figure 8:
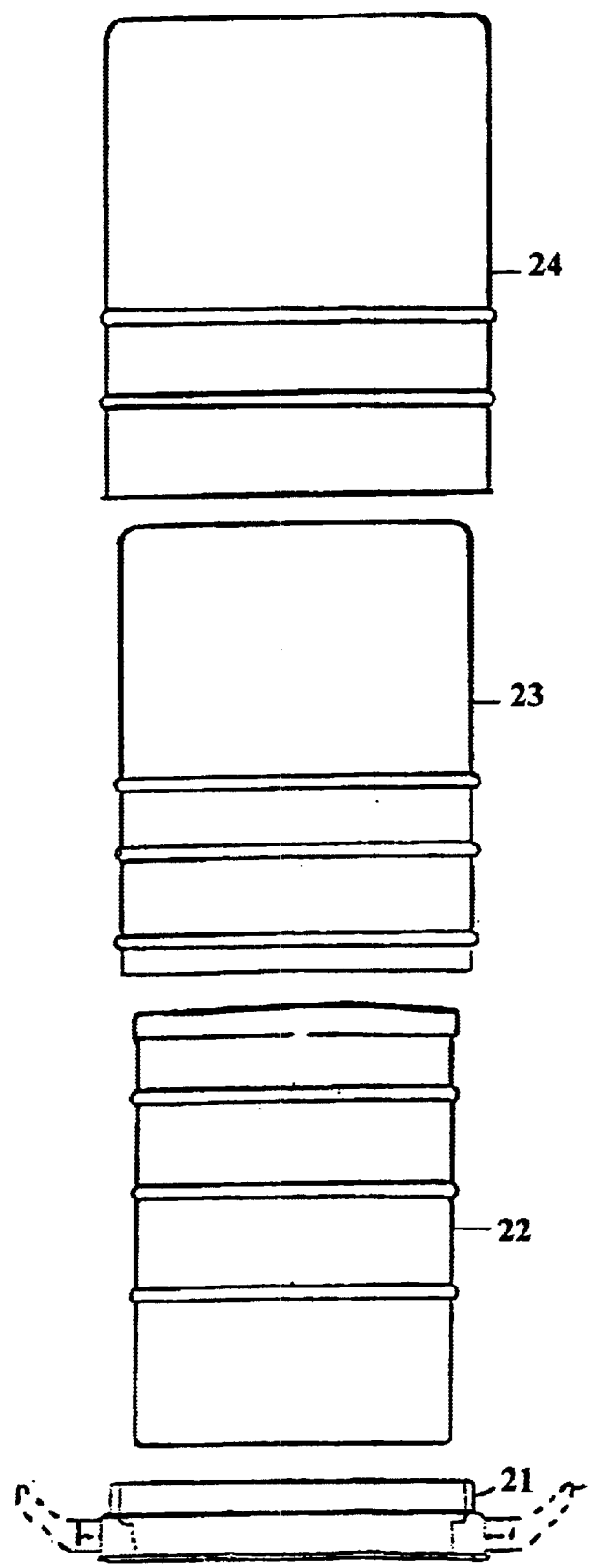

FIG. 8 is an exploded view of an embodiment of the cooking device of the invention.

Figure 9:
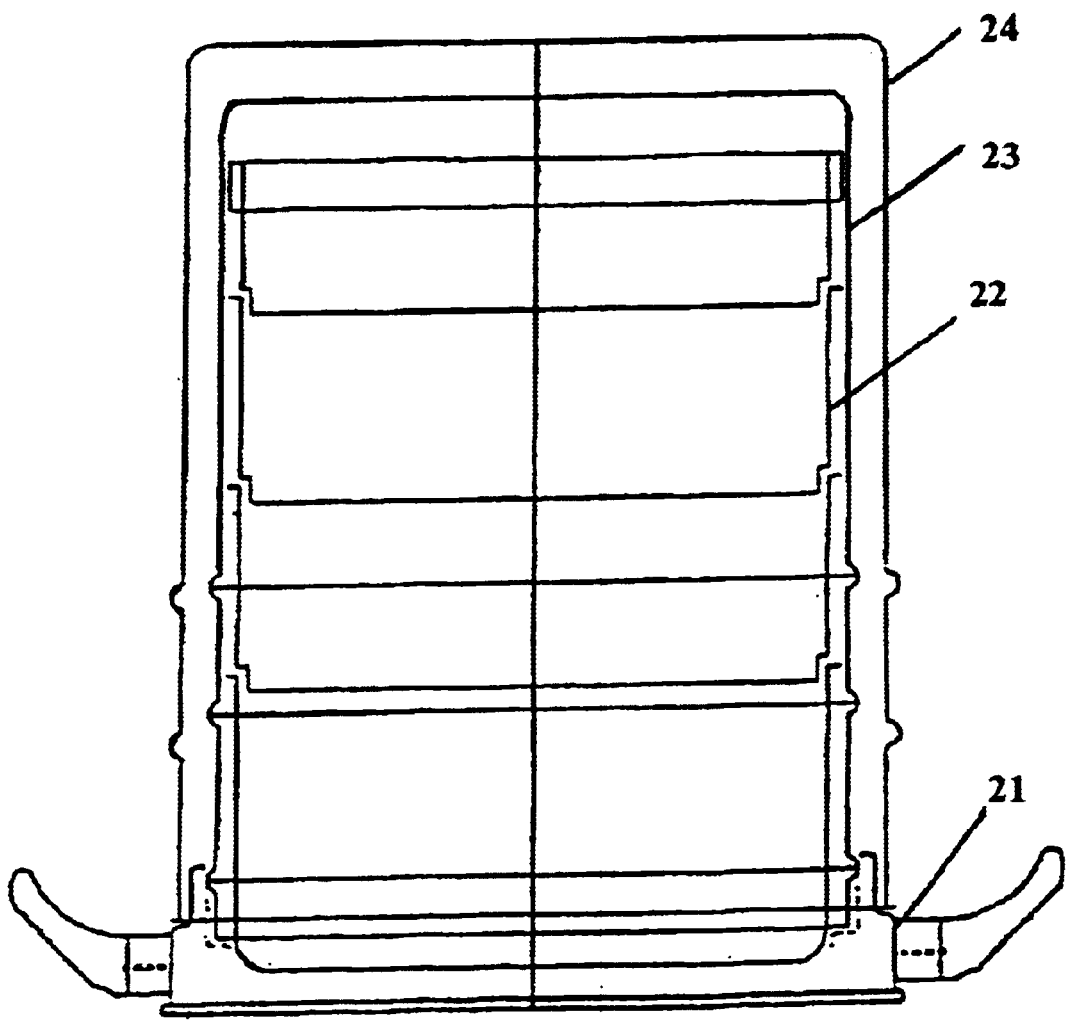

FIG. 9 is a view of the assembly of the cooker of the invention.

Figure 10:
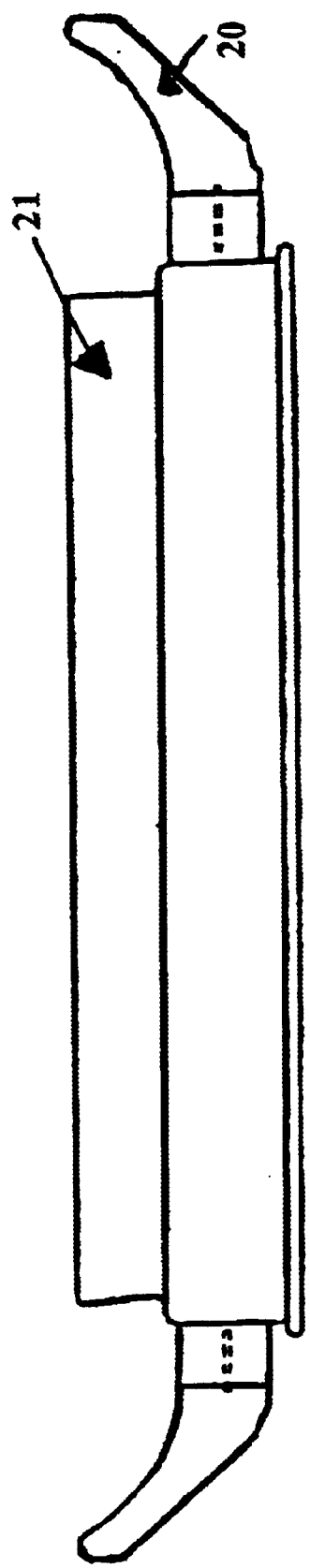

FIG. 10 is the frontal view of the basal receptacle of the cooker of the invention.

Figure 11:
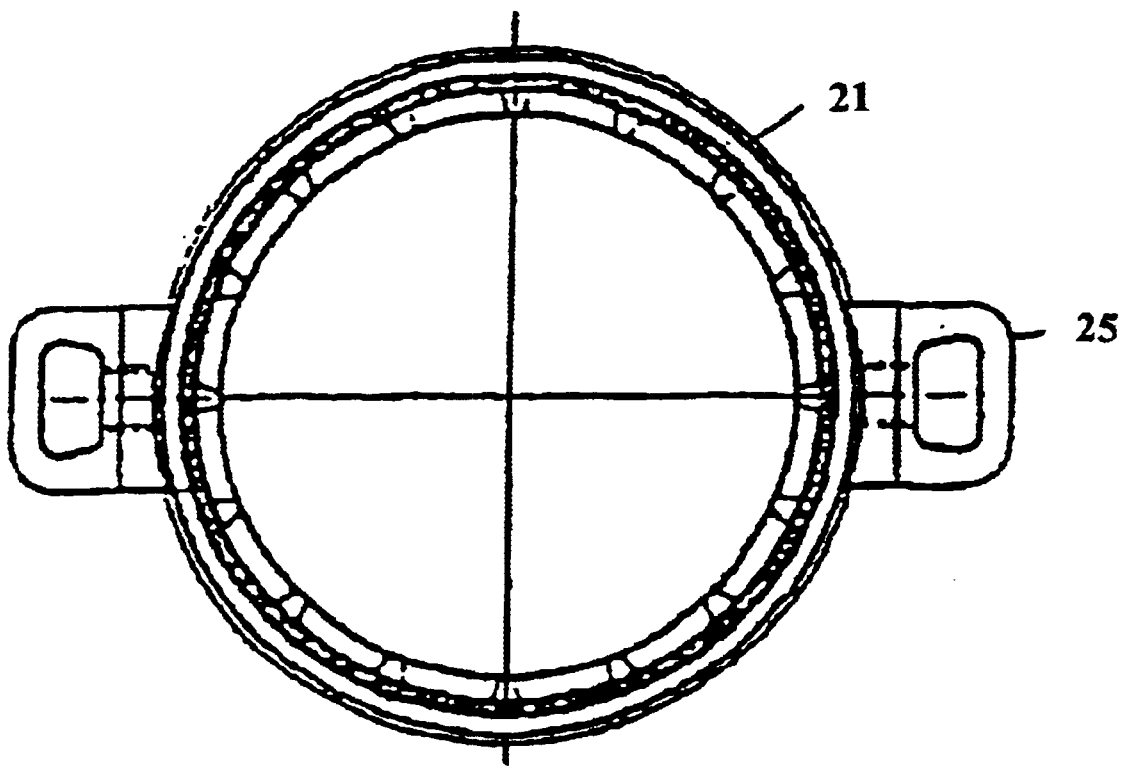

FIG. 11 is the top view of the basal receptacle of the cooker of the invention.

FIGS. 12(i)&(ii) is the cross-sectional view of the basal receptacle of the cooker of the invention.

Figure 13:
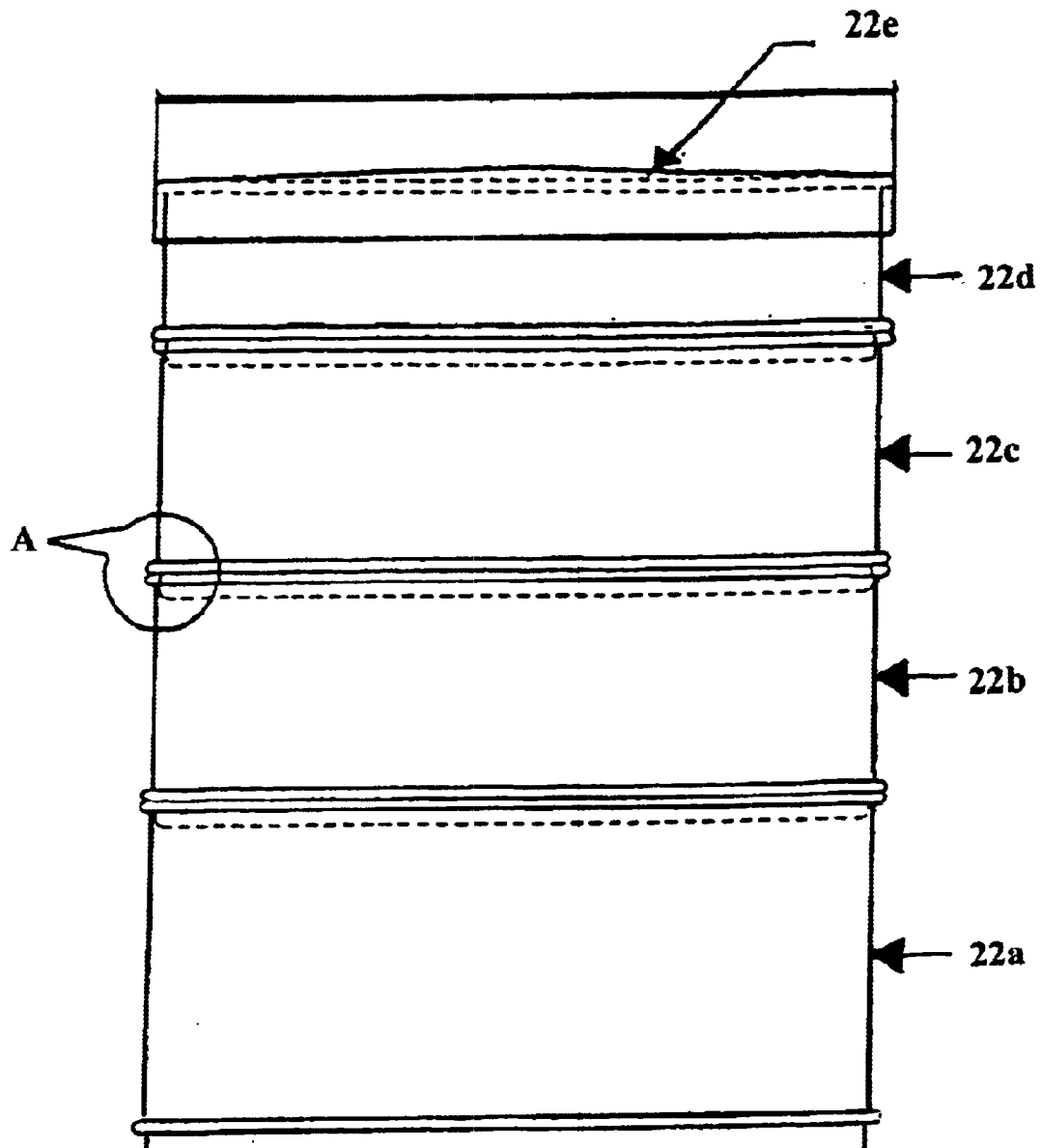
Figure 13:
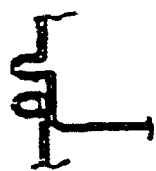

FIG. 13 is the cross-sectional view of the stack of cooking utensils of the cooker of the invention.

Figure 14:
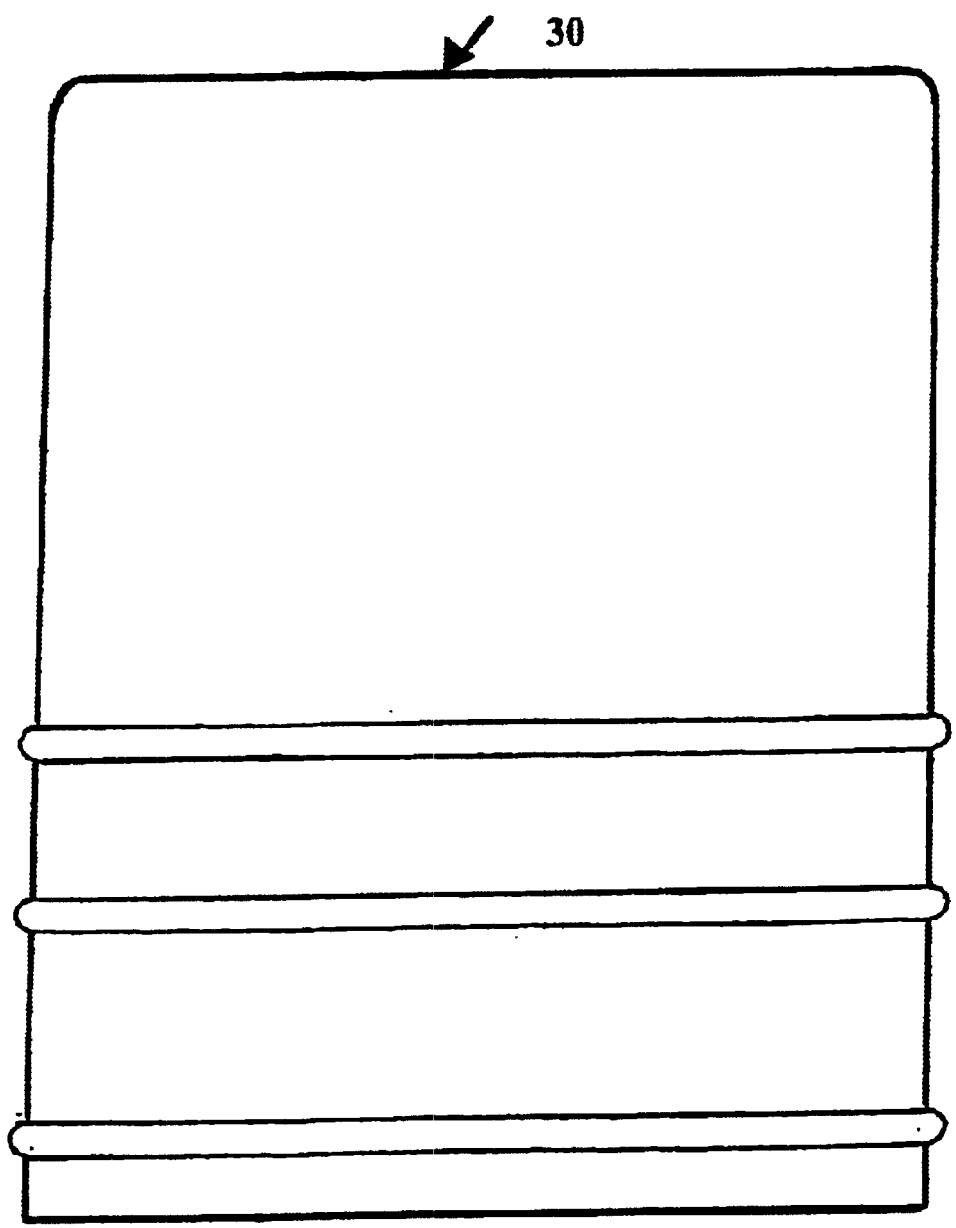

FIG. 14 is a view of the inner cover of the cooking device of the invention.

Figure 15:
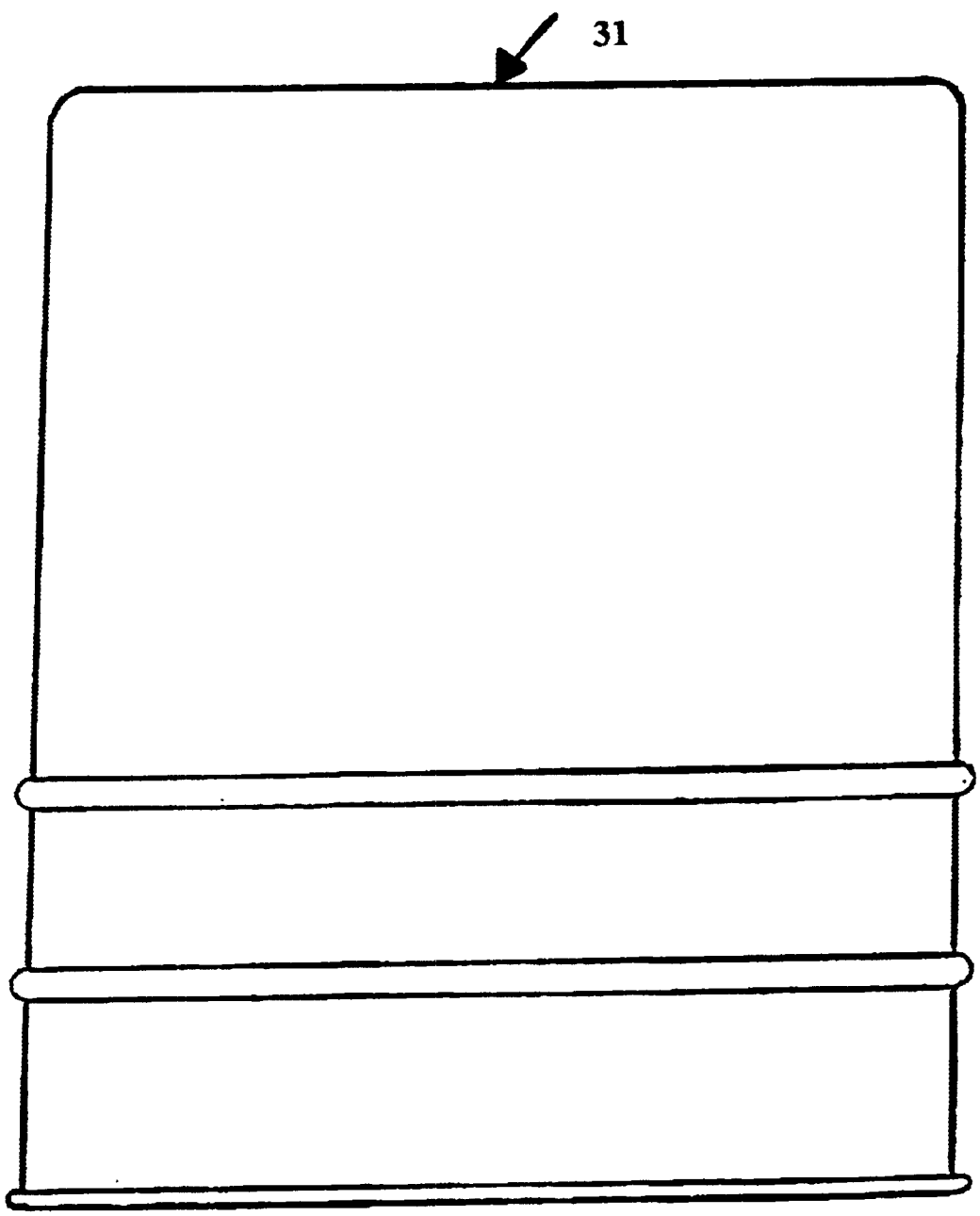

FIG. 15 is the view of the outer cover of the cooking device of the invention.

The efficiency of the cooking device of the invention is attributed to the following principles used in the construction thereof:

(i) The cooking flame is small in diameter in relation to the diameter of the base of the cooking device in contact with the flame. The rate of heat supply is highly reduced, being of the order of 0.5 KW as against conventional cookers that use 1 KW or 2 KW or more. If food is cooked using liquefied petroleum gas (LPG) or any cooking gas, then the flame is kept at simmer. These two measures ensure that all the heat supplied is concentrated towards the center of the base of the cooking device, and as much of the heat as possible is absorbed by the cooking device. It also ensures that a substantial portion of the heat provided by the flame is absorbed by the cooking device only. Therefore no heat is wasted up the sides of the cooking device.

(ii) Insulation of the cooking pot around its perimeter: The cooking device is devised such that at least one insulator is provided around the cooking vessels. If air is used as an insulator between cover around the cooking vessels and an outer cover, the trapped air helps to retain the heat which is supplied to the cooking device. Retention of heat makes the rise of temperature in the device faster and helps maintain the elevated temperature in the cooking device with minimal supply of additional heat.

(iii) Terminating heat supply before cooking is complete: On account of the insulator provided in the cooking device, once a temperature of 100° C. has been reached, it is possible to maintain this elevated temperature for a sufficiently long period to continue slow cooking of the food items with no further supply of heat. Therefore, if the supply of heat is terminated after a brief period, the food kept in the device continues to cook with the heat retained in the device by the insulator. During this period, the device is slowly cooling but the food therein is still cooking as the vessels containing the food items are insulated from heat loss.

(iv) Stacking of food items in containers: This system of stacking food in a series of containers saves fuel to a great extent compared to the process of cooking the same quantity of food in a single large container. The principle behind this device is known as "multi-stage evaporation". According to this, once steam is generated in the lower-most portion of the stack, the steam travels upwards and condenses at the bottom of the immediate next portion. The heat absorbed by the said immediate portion then generates steam in turn and by condensation the heat is passed on to the next portion and so on.

Because the construction of the cooking device of the invention is effected employing each of the above principles, the fuel economy achieved by the cooking device is more than 70% as compared to conventional cooking systems. Each of the above principles embodied in the construction of the cooking system, when used alone, ensures that about 30% of the fuel normally consumed while cooking in traditional cooking devices is saved. Therefore, when all four principles are used in combination, the final fuel consumption by the device is saved to the extent of 70% or more.

As shown in FIGS. 8 and 9, the cooking device of the invention consists of the following parts:

(i) basal receptacle (21) of heat conductive metal or material;

(ii) one or more cooking vessels (22) stacked one on top of the other, wherein the diameter of the cooking vessels is in general less than the diameter of the basal receptacle;

(iii) an inner cover (23) capable of being engaged with the basal receptacle and covering the stack of cooking utensils, said inner cover having a diameter greater than that of the widest cooking utensil and the diameter at the margin of the inner cover being less than the basal receptacle; and (iv) an outer cover (24) capable of engaging with the basal receptacle, and covering the entire assembly, wherein the diameter of the outer cover is greater than the cooking utensils as well as the inner cover, and the diameter of the margin of the outer cover being less than or equal to the diameter of the basal receptacle.

Figure 12:
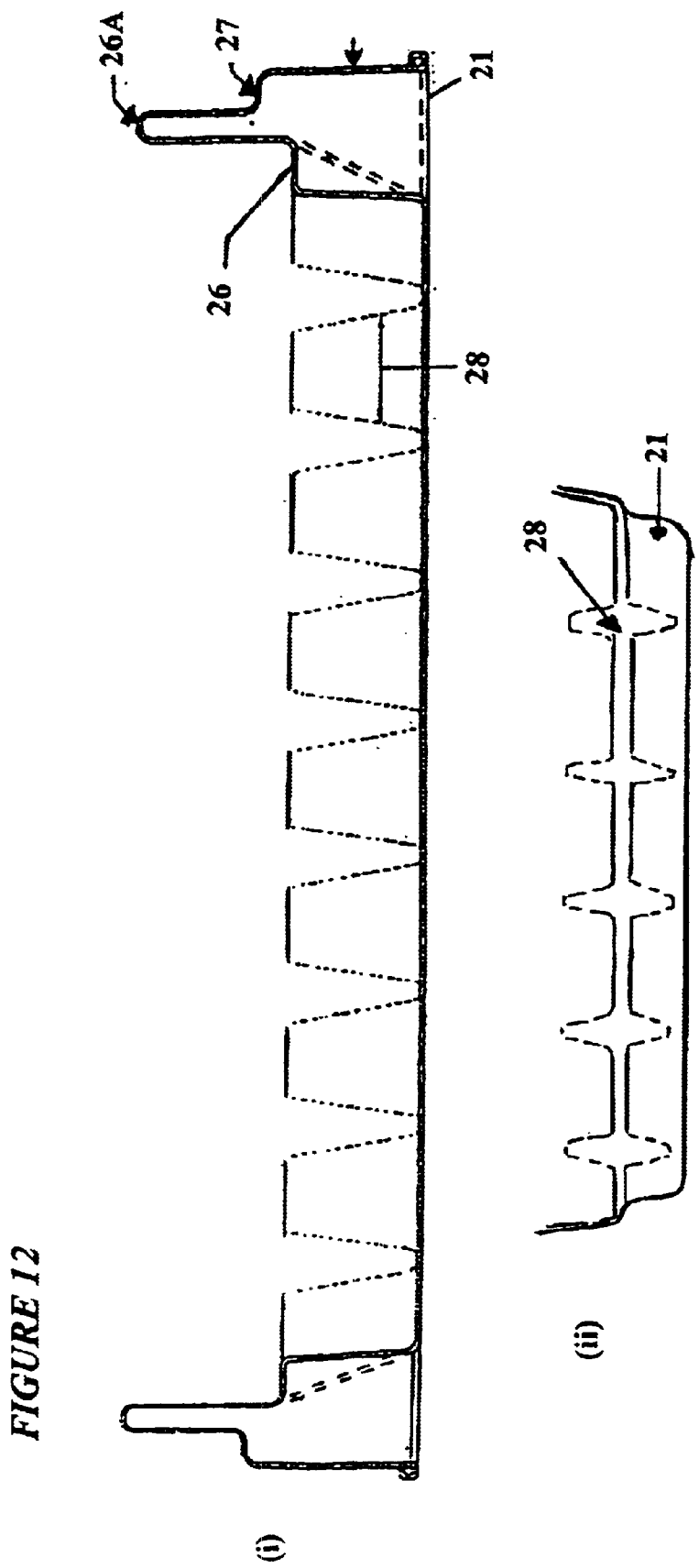

The basal receptacle of the cooking device (21) may be made of any metal or material capable of excellent heat conductivity. The receptacle may be concave or shaped so as to hold water. This basal receptacle has separate means that allow and accommodate the cooking vessels (22) to be stacked therein. FIG. 12 shows an example of such means, i.e. ridges (26). This basal receptacle also has means for firm engagement of the inner and the outer covers that fit over the basal receptacle. The means may be selected from ridges, grooves, clips, notches, hooks and threads. Example means shown in FIG. 12 are ridges (26, 26A & 27). In a preferred embodiment, ribs may be provided for engagement of the inner and the outer covers with the basal receptacle. The inner and the outer covers may optionally be threadably engaged to the basal receptacle. This basal receptacle may optionally be fitted with means for easy transportation of the assembled system. One example of such means are horizontally projecting handles (25) as shown in FIG. 10. Other examples include handles, frames and cradles. FIG. 10 shows the frontal view of the basal receptacle. FIG. 11 shows the view of the receptacle from the top. FIG. 12 that shows the cross sectional view of the basal receptacle of the cooking device.

In one embodiment, the inner surface side of basal receptacle may be provided with a plurality of steam vents (28) as shown in FIG. 12(*i*). The function of the steam vents is to allow steam to escape from below the lowest cooking vessel into the steaming chamber. Too few vents, or too small a venting area results in the build-up of steam below the lowest cooking vessel. The steam vents help to prevent expulsion of the water out of the basal receptacle. If such vents are not provided, the water in the basal receptacle gets expelled, what is left dries up. As a result, steam can no longer be generated, and the food does not get fully cooked. In yet another embodiment, vents for steam can be provided at the bottom of the lowest vessel. In yet another embodiment, steam vents are provided in both, the bottom of the lowest vessel as well as the inner surface of the basal receptacle as shown in FIGS. 12(*i*) and (*ii*).

According to another embodiment, the entire assembly of the cooking vessels (22) may also be placed on a stand which is placed on the basal receptacle. In this case, the basal receptacle need have no stepped inner bottom providing seating for the cooking vessels; this also dispenses with the need for steam vents altogether; since the entire annular space between the wall of the cooking vessels and the inner wall of the basal receptacle is available for steam escape.

As said above, the cooking device consists of one or more cooking vessels (22a to 22d) stacked one on top of the other as shown in FIG. 13. Each of the cooking vessels one on top of the other, placed as a stack in the basal receptacle. The cooking vessels are generally of constant diameter, although the height of each of the vessels may be varied depending upon the quantity of the food items to be cooked. The cooking vessels could also be of varying diameter, such that when placed in order of diminishing diameter they nest one within the other, and when placed in reverse order they stack above each other. A tight fit between one vessel and the next is not essential. Again, the cooking vessels or utensils are made of metal or material capable of excellent heat conductivity.

As shown in FIG. 13 the stack of vessels or utensils is such that they each fit into the other, and as an assembly can be placed on the basal cooking receptacle. The upper-most vessel of the stack may be provided with a cover or a lid (22e) in order to trap and retain the flavour of the food in that vessel. The stack of vessels may optionally be provided with a frame or cradle (not shown in the diagram) for easy handling of the containers. Further, the cooking vessels may optionally be placed on a stand placed on the basal receptacle, as said earlier.

The device further comprises a inner cover (30) that covers the cooking vessels and this cover is generally in the form a cylinder with one end open. Preferably, in this case, the open end is located at the bottom of the inner cover. It may acquire different shapes or heights depending on the basal receptacle, the height of the basal receptacle and the height of the stack of cooking vessels. If this inner cover is in the form of a cylinder, and if the basal receptacle is low in height, then the inner cover is designed such that it covers the assembly and the open end engages with the basal receptacle. The steam generated in the device condenses inside this inner cover and drips back into the basal receptacle. This cover must essentially be made of material that provides rigidity and is unbreakable, easy to clean, and cheap to produce. Ideally, it could have very low heat conductivity. FIG. 14 shows an example of the inner cover envisaged according to the invention. The cover may be made of metal, which satisfies all the requirements set out above, except the requirement of low heat conductivity.

Another aspect of the cooking device is the outer cover (31) which is designed and is fitted such that it covers the entire assembly including the upper part of the basal receptacle. An example of this cover is shown in FIG. 15 of the accompanying drawings. This cover may be cylindrical with one end open. This outer cover is only required if the inner cover is made of metal or other material of high conductivity. In such a case, the outer cover provides an air gap between the two covers, and it is this air gap that provides the insulation needed by the cooking device. The outer cover is also designed such that its height is adjusted depending on the height of the basal receptacle, and the height of the inner cover. Care is taken to ensure that there is a sufficient but not excessive gap between the inner cover and the outer cover such that air is trapped in this gap and acts as an insulator. The requirements for the outer cover are the same as for the inner: it must be rigid, unbreakable, easy to clean, cheap to produce, and preferably of low heat conductivity. In order to achieve an economical cooking device, this outer cover may be made of metal. If the inner cover is made of an insulating or other material of low heat conductivity, the outer cover may be dispensed with altogether.

In a preferred embodiment, the inner and outer covers (30 & 31) may be replaced by a separate insulator.

As mentioned earlier, it is important in the device of the invention to provide a means for trapping and retaining the heat generated by the supply of heat to the device. Such a means may be an insulator. While any kind of insulation may be used around the cooking pot cover, the cheapest insulator is air. It is the air gap between the inner cover and the outer cover that provides the desired insulation. For best results, this gap is required to be 5 mm or less. With such a narrow gap air does not circulate, there are no convection currents, and heat losses by convection across the air gap are prevented. Various other insulators can be used such as ceramics, fiberglass, glass wool, or any other insulating material, or a vacuum, in which case, the inner and outer covers around the basal receptacle may have to be merged.

Heat is supplied through an external source. The supply of heat to the device may be through any fuel system such as coal, kerosene, gas, wood, biomass or cow-dung. Where electricity is the desired fuel system, a heating element may be provided in the basal receptacle along with appropriate means to enable absorption of heat and transmission of electric supply to the cooking device. It is essential that the size of the flame or stove below should be small in relation to the diameter of the basal receptacle of the cooking device. This minimizes heat losses from the edges of the stove and up the sides of the cooking device. This also ensures that most of the heat produced by the flame or stove is absorbed by the cooking device. If the heat source is electricity, it is important to ensure that the diameter of the source be significantly smaller than the diameter of the basal receptacle of the cooking device. Similarly, for firewood or charcoal stoves, the source of supply of heat must have a much smaller diameter than the basal receptacle of the cooking device.

The division between basal receptacle and the covers of the cooking device may be at any height. For example, the basal receptacle could be generally concave and supplied with a flat lid on top. In an embodiment, the stack of cooking vessels may be placed inside a lifting frame, with the help of which the assembly of cooking vessels would be lowered into the cooking pot, and after cooking is complete lifted out again. However, lifting a full load in and out is inconvenient. The present construction has a split between basal receptacle and cover at a low level. This eliminates the lifting frame, thus saving cost, and has the added advantage that the cooking vessels can be removed one by one, including the lowest vessel, without the need to lower one's hands inside the basal receptacle. The level at which the split between basal receptacle and cooking pot cover is made makes no difference to the performance of the cooker.

Method of cooking: According to a preferred method of the practice of the invention, various food items are first prepared, and each item is placed in one of the cooking vessels that make up the stack. The food that is kept in the vessels is prepared in the usual way, as one would do for normal cooking. All spices are added, including salt. If cooking calls for spices spluttered in oil to be added to the food, these too could be added at this stage.

It is important that the water in the basal receptacle is in contact with the lowest cooking vessel when cooking begins. This is to allow rapid heat transfer from the water in the basal receptacle to the food in the lowest container.

The cooking vessels are assembled in a stack, with the hardest-to-cook item placed at the bottom, other items in between, and the second-hardest-to-cook item on top. It is not necessary that the largest cooking utensil should be at the bottom, or the smallest at the top. The cooking utensils can be placed in any order. The number of utensils will depend on the number of items to be cooked. It is not necessary to use all the cooking vessels supplied. If there are fewer items to cook, fewer vessels may be used. But when there are fewer items, and these include a large quantity of one particular item, it is better to divide this larger quantity into two vessels containing the same item. For the same volume of cooking, the larger the count of vessels in the stack, the more economical is the cooking in terms of fuel consumption.

The basal receptacle is preferably in the form of a basin allowing space/means for utensils to be stacked, water to be placed therein, etc. The basal receptacle is placed on the stove, and filled with water until the water touches and embraces the lowest cooking vessel.

The stack of cooking vessels, with food inside, is placed in the center of the cooking pot. Before heat is applied to the cooking system, the bottom of the lowest vessel must be in contact with the water in the base.

The assembly of cooking vessels is covered with the inner and outer covers.

If the fuel being used is gas, the burner must be kept on 'low flame' or 'simmer' position from the start. The flame should be the lowest possible from the smallest burner available. This will normally provide a gas flow rate of about 5 cc/second.

At the end of about one hour or less, the flame is switched off. During the hour that it is burning, the cooker needs no attention, and the cook can go about doing other work. It is important to ensure that the stove is not in a windy place, where the flame can get blown out and the gas will then continue to leak. The one-hour period is for an almost fully charged cooker, with each of the cooking containers more or less full to capacity. For reduced volumes of cooking one can shorten the time the flame is left on. The exact duration for different volumes of food can be determined by trial and error, but a good thumb rule is 20 minutes+10 minutes per kilogram of charge. It is also important that when the flame is switched off, after an hour or so, the water in the basal receptacle is no longer in contact with the lowest vessel. The period of "cooling", when the flame is switched off but the cooking device is not opened, is important to finish cooking. During this cooling period the cooking vessels must be maintained at as high a temperature as possible, as food continues to cook during this time. In case, water were to remain in contact with the lowest vessel, this vessel would cool too rapidly, and the food within might remain only partially cooked.

In a preferred embodiment, where electricity is the desired source of heat supply, means for manually or automatically regulating or controlling temperature can be provided. For example, the basal receptacle may be fitted with a heating element, thermostatic control means and timer means so as to control the application of power to the heating element in the basal receptacle. The thermostatic control unit includes a temperature sensor element which is placed in contact with the cooking device such that the thermostatic control means is able to determine the temperature of the cooking medium in the cooking device. A power cord is also provided extending from the device for supplying power to the thermostatic control means and timer means as well as to the heating element in the cooking device via connections. In one embodiment, the basal receptacle is provided with a temperature indicator means. The temperature indicator indicates when the temperature within reaches 100° C., at which time the heat supply may be manually or automatically switched off. After switching off, a timer device could indicate when the half-hour period for continued cooking while cooling takes place is complete, and the device can then be opened. It is also possible to provide, as a preferred embodiment, a microcomputer that is capable of accepting "time to hold at 100° C." and "time to cook while cooling". Depending upon the food items to be cooked, these two timings may be set. Once the supply of heat is commenced, the cooking of the food items in the device commences once each item of food reaches its minimum cooking temperature. The process of cooking continues for each food item as long as its temperature is above its minimum cooking temperature. The thermostatic control means regulates the fuel/heat supply, and terminates the supply of heat to the device at a suitable point. With the termination of fuel supply, the cooking in the device continues until the temperature of each item in the device falls below its minimum cooking temperature. The termination of fuel supply is effected when the food items are partially-cooked.

After switching off the flame, the cooker must not be opened for at least another half an hour. This is because cooking is only partly complete when the flame is switched off: the food continues to cook in its own heat for a half-hour or more. The user may take the assembly off the stove and put it to one side if so desired, thus freeing the stove for other cooking. Care needs to be exercised when lifting the assembly to make sure that it does not overbalance or topple. If desired, the handles can be made taller so that the danger of toppling is minimized.

Ideally, the cooker should be opened just prior to serving the food. This ensures that no re-heating is required. The outer and inner covers are removed using appropriate conventional means and methods. Ridges handless or holders may be provided on the covers to improve the grip. The cooking vessels are similarly removed.

There is no damage to the food if the gas is left on for too long. It only results in some waste of fuel. If left on for far too long, say for several hours, the basal receptable may dry out totally, and metal-to-metal heat conduction may then result in some of the food in the lowest container being partially burnt.

Ideally, when the cooker is opened, there should be a small amount of water left in the basal receptacle of the cooking device. This indicates that the desired fuel economy is being achieved.

If the fuel being used is other than gas or kerosene, the user may have to experiment as to how best to maintain low heat in the cooker for one hour without the fire needing repeated attention.

The foregoing description of the cooking device is considered illustrative of some of the preferred embodiments of the invention. Various modifications and changes that can be readily made by a person skilled in the art, are considered to be encompassed within the scope of the present invention. Accordingly, the embodiments illustrated above are not desired to limit the scope of the invention to the exact constructional and operational features as herein described. Suitable modifications and equivalents may be resorted to, within the scope of the invention.

What is claimed is:
1. A steam cooking device comprising:
a) basal receptacle (21) of heat conductive metal or material for holding water;
b) one or more cooking utensils (22) stacked one on top of the other such that each of the utensils in the stack fit into each other and the diameter of the largest cooking vessel is in general less than the diameter of the basal receptacle and the water in the basal receptacle touches the lowest cooking utensil;
c) an inner cover (23) capable of being engaged with the basal receptacle and covering the stack of cooking utensils, said inner cover having a diameter greater than that of the widest cooking utensil and the diameter at the base of the inner cover being less than the basal receptacle;

d) an outer cover, (24) capable of engaging with the basal receptacle, and covering the entire assembly, wherein the diameter of the outer cover is greater than the cooking utensils as well as the inner cover and the diameter at the base of the outer cover being less than or equal to the diameter of the basal receptacle, and e) a gap of about 5 to 10 mm of stagnant air free of convection currents, is provided between the inner cover and the outer cover.

2. A device as claimed in claim 1 wherein the basal receptacle is provided with means for engagement of the inner cover and outer cover.

3. A device as claimed in claim 2 wherein the means for engagement is selected from the group comprising ridges, hooks, grooves, ribs, notches, clips and threads.

4. A device as claimed in claim 1 wherein the basal receptacle is optionally provided with means for handling of the device.

5. A device as claimed in claim 4 wherein the means for handling is selected from handles, holders, frame and cradle.

6. A device as claimed in claim 1 wherein the device comprises an insulator between the inner cover and the outer cover.

7. A device as claimed in claim 6 wherein the insulator is selected from the group comprising ceramic, fiberglass, glass wool, vacuum and air.

8. A device as claimed in claim 1 wherein heat is supplied to the device by an external source or means for supply of heat.

9. A device as claimed in claim 1 wherein the means for supply of heat is selected from the group comprising, gas, electricity, wood, kerosene, biomass, cowdung and charcoal.

10. A device as claimed in claim 1 wherein the basal receptacle is optionally provided with a heating element when the source of heat supply is electricity.

11. A device as claimed in claim 1 wherein the basal receptacle is provided with a plurality of steam vents.

12. A device as claimed in claim 1, wherein the cooking utensils are optionally seated on a stand placed on the floor of the basal receptacle.

13. A device as claimed in claim 1 wherein the height of the side wall of the basal receptacle, the inner and outer covers and the cooking utensils is variable.

14. A device as claimed in claim 1 further comprising indicator means to indicate whether cooking is complete or not.

15. A device as claimed in claim 1 further comprising thermostatic control means to set the minimum and maximum temperature to be attained by the device.

16. A device as claimed in claim 1 further comprising temperature indicator means to indicate the temperature of the steam/food items in the cooking device.

17. A device as claimed in claim 1 further comprising timer means for indicating the time taken for cooking.

18. A device as claimed in claim 1 wherein the cooking utensils are of constant or varying diameter and made of heat conducting material.

19. A device as claimed in claim 1 further comprising a frame for lowering and raising of the stack of cooking utensils in and out of the basal receptacle.

20. A device as claimed in claim 1 wherein the diameter of the basal receptacle is significantly larger than the source of supply of heat.

21. A device as claimed in claim 1 further comprising means for regulating and controlling the heat supply.

22. A device as claimed in claim 1 wherein the uppermost utensil of the stack of utensils is provided with a lid or cover.

23. A device as claimed in claim 1 wherein the inner and outer covers are made of material having low heat conductivity.

24. A device as claimed in claim 1 wherein the food item which is hardest to cook is placed at the bottom-most utensil of the stack of cooking utensils and the second hardest to cook is kept at the top of the stack of the cooking utensils.

25. A device as claimed in claim 1 wherein the basal receptacle is optionally concave to hold water and also to facilitate stacking of utensils on the lowest vessel and the bottom of the lowest vessel remains in contact with the water when cooking begins.

26. A device as claimed in claim 1 wherein steam vents are optionally provided at the bottom of the lowest vessel.

27. A device as claimed in claim 1 wherein the steam vents are optionally provided in both, the bottom of the lowest vessel as well as the inner surface of the basal receptacle.

* * * * *